United States Patent [19]

Jones

[11] Patent Number: 4,736,186

[45] Date of Patent: * Apr. 5, 1988

[54] EMERGENCY WARNING SIGNAL

[76] Inventor: Richard D. Jones, 1174 Highland Rd., Mundelein, Ill. 60060

[*] Notice: The portion of the term of this patent subsequent to Oct. 15, 2002 has been disclaimed.

[21] Appl. No.: 786,207

[22] Filed: Oct. 10, 1985

Related U.S. Application Data

[63] Continuation-in-part of Ser. No. 559,731, Dec. 9, 1983, Pat. No. 4,547,761.

[51] Int. Cl.⁴ .................. G08B 5/00; H05B 39/00; G08G 1/07
[52] U.S. Cl. .................. 340/331; 340/906; 340/332
[58] Field of Search .......... 340/906, 331, 332; 323/906; 136/291; 362/331, 333, 334; 455/345, 352

[56] References Cited

U.S. PATENT DOCUMENTS

| | | |
|---|---|---|
| 803,348 | 10/1905 | Lebeis . |
| 881,264 | 3/1908 | Schermerhorn . |
| 1,028,591 | 6/1912 | Moyes et al. . |
| 1,299,854 | 4/1919 | Neely . |
| 1,375,540 | 4/1921 | Smith . |
| 1,669,055 | 5/1928 | Hogg . |
| 1,703,224 | 2/1929 | Challis et al. . |
| 1,713,021 | 5/1929 | Bryce . |
| 1,806,915 | 5/1931 | Pinkus . |
| 2,026,385 | 12/1935 | Heyde . |
| 2,208,297 | 7/1940 | Lipp . |
| 2,346,325 | 4/1944 | Oliver . |
| 2,638,583 | 5/1953 | Edwards, Jr. . |
| 2,705,751 | 4/1955 | Harris et al. . |
| 2,718,635 | 9/1955 | Sabiers . |
| 2,825,803 | 3/1958 | Newbrough . |
| 2,881,409 | 4/1959 | Cook et al. ............ 340/906 |
| 2,890,444 | 6/1959 | Turk . |
| 2,910,680 | 10/1959 | McLain . |
| 3,122,736 | 2/1964 | Weber . |
| 3,257,641 | 6/1966 | Campana et al. ............ 340/906 |
| 3,390,576 | 7/1968 | Yellott .................. 136/291 |
| 3,593,016 | 7/1971 | Cordel . |
| 3,599,201 | 8/1971 | Clardy et al. . |
| 3,913,092 | 10/1975 | Klingenberg . |
| 4,003,040 | 1/1977 | Browand . |
| 4,017,825 | 4/1977 | Pichey ................ 340/906 |
| 4,108,405 | 8/1978 | Gibson ................ 136/291 |
| 4,115,757 | 9/1978 | Blahunka ............. 340/906 |
| 4,214,168 | 7/1980 | Kulka ................. 362/311 |
| 4,223,295 | 9/1980 | Bonner et al. . |
| 4,228,419 | 10/1980 | Anderson ............ 340/906 |
| 4,296,400 | 10/1981 | Friedbert et al. . |
| 4,443,783 | 4/1984 | Mitchell . |
| 4,547,761 | 10/1985 | Jones ................. 340/331 |

OTHER PUBLICATIONS

N. V. Pul'manov and V. N. Potapov, "Operational Tests on Photoelectric Generators for Navigational Beacons", *Geliotekhnika*, vol. 10, No. 3, pp. 23–27, 1974.

Primary Examiner—Ulysses Weldon
Assistant Examiner—Ralph E. Smith
Attorney, Agent, or Firm—Welsh & Katz, Ltd.

[57] ABSTRACT

An emergency warning system for notifying passersby of the approach of an emergency vehicle to an intersection is provided. The system comprises a flashing light, a solar collector and a rechargeable battery electrically connected to the light. The device is obtained within a housing which is mounted near the distal end of a street light pole or stoplight. A switching mechanism is contained in the device which includes a radio receiver. A wireless transmitter carried by the emergency vehicle actuates the switching mechanism so as to provide warning of the approach of the vehicle to the intersection. Horns attached to the device also are actuated so as to provide an audible warning. Because of the use of the solar collector, no electrical connections are required between the device and the stop light.

3 Claims, 2 Drawing Sheets

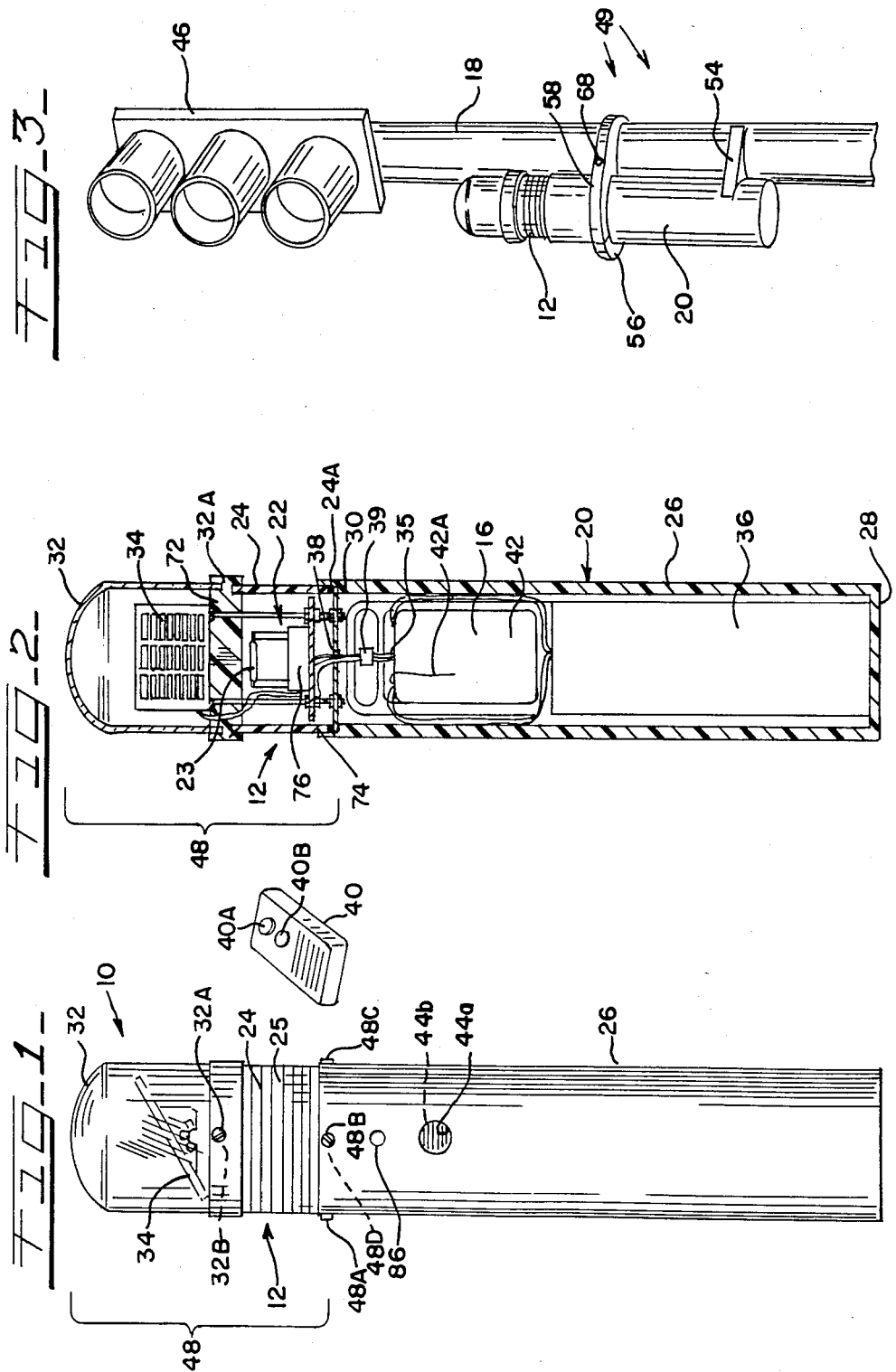

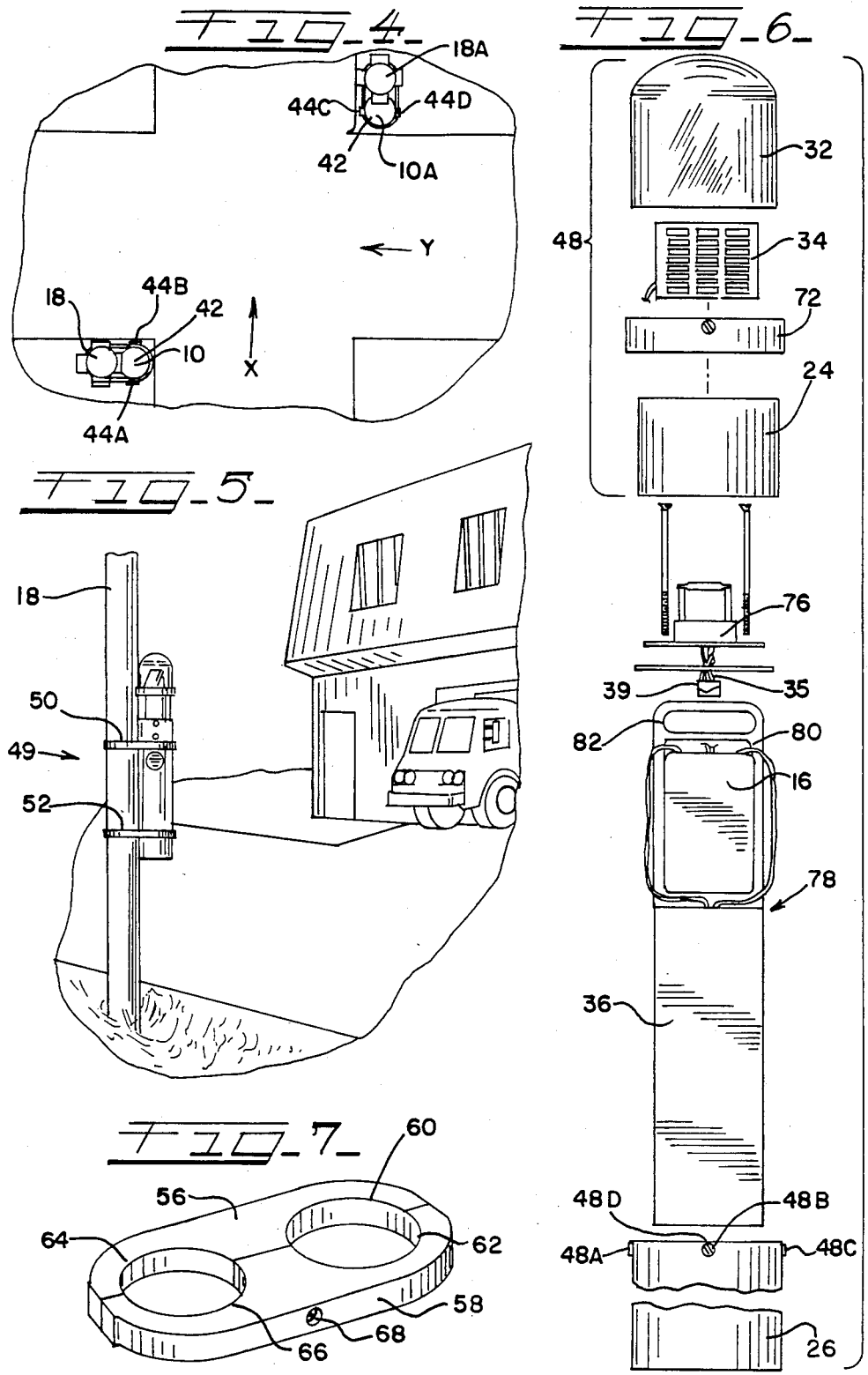

EMERGENCY WARNING SIGNAL

BACKGROUND OF THE INVENTION

The present invention is a continuation in part of U.S. application Ser. No. 559,731 filed Dec. 9, 1983, now U.S. Pat. No. 4,547,761. The specification and claims of the aforesaid application are hereby incorporated by reference.

The present invention relates to a distress light and signal systems and, more particularly, to a distress light and signal mounted at an intersection and used to warn motorists and pedestrians of the approach of an emergency vehicle.

In the past there have been many diverse types of emergency warning lights used by both muncipalities and in the home. In particular, emergency lights have been utilized in the past at intersections where emergency vehicles are approaching. This function has been accomplished by wiring flashing lights directly into the electrical system of stop lights. A sensor connected to the lights is actuated by the strobe lights on the emergency vehicle. However, it has been found that the connection of such emergency lights to the stop lights is extremely expensive and time consuming. In addition, extensive modification to the stop lights are required.

Accordingly, it is an object of the present invention to provide a low cost, easy to install, emergency warning system for attachment to stop lights which does not require electrical wiring to the stop light.

It is an additional object of the present invention to provide a solar powered emergency warning light system which substantially eliminates the need to replace batteries deactivated through use.

SUMMARY OF THE INVENTION

In accordance with the present invention, a distress light and signal system is disclosed. The system incorporates a light means adapted to be mounted in proximity to a road, preferably on a light pole or stop light. The light means includes a housing having a light source mounted therein. The light source comprises a flashing light surrounded by a colored translucent sleeve. The housing generally comprises an opaque tubular member having a platform at its upper end upon which the light source is mounted. A clear dome is secured to the top of the tubular member in which a solar collector is mounted. A rechargeable battery is contained within the housing and is electrically connected to the solar collector. A switching mechanism selectively actuates the light means. The switching mechanism includes a wireless transmitter, usually carried by the emergency vehicle and a receiver electrically connected to the switching mechanism and contained within the housing. When the wireless transmitter is actuated, the receiver actuates the switching mechanism, which causes the light to flash.

BRIEF DESCRIPTION OF THE DRAWINGS

FIG. 1 is a front elevational view of a distress light and signal system in accordance with the present invention;

FIG. 2 is a cross sectional view of the distress light of FIG. 1 illustrating its working components;

FIG. 3 of the drawings is a front perspective view of the distress light and signal system of FIG. 1 shown mounted on a stop light at an intersection;

FIG. 4 of the drawings is a schematic illustration of a pair of distress lights mounted on opposing stop lights at an intersection;

FIG. 5 of the drawings is a front perspective view of the distress light and signal system of FIG. 1 mounted in front of a fire station;

FIG. 6 of the drawings is a front view of the components of the distress light and signal system of FIG. 1 as shown disassembled.

FIG. 7 of the drawings is a front perspective of an improved bracket used to mount the distress light and signal system to a light pole, as in FIG. 3.

DETAILED DESCRIPTION OF THE PREFERRED EMBODIMENT

While the present invention is susceptible of embodiment in many different forms, there is shown in the drawings and will herein be described in detail several specific embodiments with the understanding that the invention is not limited thereto, except in so far as those who have the disclosure before them are able to make modifications and variations therein without department from the scope of the invention.

As best shown in FIGS. 1-3 of the drawings, the reference numeral 10 designates generally a distress light and signal system in accordance with the present invention. The system 10 includes a light means 12 adapted to be either anchored in the ground 14 or mounted on a light pole 18. A switching mechanism 16 is utilized for selectively actuating the light means 12 in an emergency so that, in the case of an intersection, motorists may be warned of the approach of an emergency vehicle. Alternatively, when used in conjunction with a home, a person responding to an emergency may reach the site of the emergency rapidly by visually locating the light means 12 upon reaching the vicinity of the house.

Referring to FIG. 2, the light means 12 includes a housing 20 having a light source 22 mounted therein. The light source 22 may comprise a revolving reflector light surrounded by a colored translucent sleeve 24. Particularly preferred sleeve colors are red, white, blue, green and amber, or combinations thereof. Alternatively, and preferably, the light source 22 comprises a strobe light 23 which utilizes less than one half milliampere of electrical current. Housing 20 is generally constructed an an opaque tubular member 26 secured to a base 28. The tubular member 26 has a platform 30 at its upper end upon which a light source 22 is mounted. The housing 20 also includes a clear dome 32 releasably secured to the translucent sleeve 24. Translucent sleeve 24 in turn is releasably secured to the tubular member 26 adjacent platform 30.

A solor collector 34 is mounted in the clear dome 32 as part of the light means 12. A rechargeable battery pack 36 is disposed in housing 20. The rechargeable battery pack 36 is electrically connected to the solar collector 34 by means of wires 35 passing through the aperture 38 in the platform 30. Wires 35 in turn contain a quick disconnect coupling 39, which facilitates separation of battery pack 36 from light means 12 and solar collector 34, thereby allowing easy repair and replacement of battery pack 36.

Referring now to FIGS. 1 and 2, switch means 16 includes a transmitter 40 adapted to be retained either on emergency vehicles or in the home of the user. Transmitter 40 is suitably of the type normally associated with garage door openers. It is a small, rectangular, hand held, battery operated device which includes a push button 40A which when depressed sends a signal at a preselected frequency from the house emergency vehicle to the switch means 16.

In order to prevent interference with reception of the aforesaid signals, opaque tubular member 26 is preferably formed of a substantially non-conductive material, preferably plastic, which both conceals and protects battery pack 36, receiver 42 and antenna 42A. Receiver 42 is electrically connected to switch means 16. Receiver 42 is actuated by reception of a signal from transmitter 40. Actuation of receiver 42 in turn actuates switch means 16, and thereby light means 12.

In one embodiment, transmitter 40 includes a pair of push buttons 40A and 40B which, when pushed, cause transmitter 40 to send different preselected frequencies to receiver 42. One of the frequencies is designed to actuate light means 12. A second frequency is designed to actuate both light means 12 and a horn 44 connected to switching mechanism 16. As a result, both visual and audible warning of the approach of an emergency vehicle is provided.

Referring now to solar collector 34, in practice, the solar collector 34 is mounted so as to be disposed at approximately a 45° angle and oriented so that the solar collector 34 faces in a generally southerly direction, for best results. With the clear dome 32, the solar collector 34 will, under normal circumstances, maintain an adequate charge in the rechargeable battery pack 36 which typically will last for an extended period of time.

As indicated in parent U.S. patent application Ser. No. 559,731, light means 12 may comprise a rotating reflector, not shown, powered by a motorized base so as to cause flashing of light 22 upon actuation of the light means 12. However, in a preferred embodiment light bulb 22 is a strobe lamp.

If there is a need to replace any of the components in the system, the light means 12 is easily accessible. It is simply necessary to separate tubular member 26 from head 48. Head 48 contains light means 12 and solar collector 34. Head 48 is separated from tubular member 26 by removal of bolts 48A, 48B, 48C and 48D or other commonly known fastening means. When this has been done, the battery pack 36 and switching mechanism 16 are readily accessible. If repairs are required to solar collector 34 or light 22, clear dome 32 and translucent sleeve 24 may also be removed by unscrewing fastening means or bolts 32A and 32B or other commonly known fastening means.

As shown in FIG. 3 and mentioned above, the distress light and signal system 10 of the present invention may be utilized by emergency vehicles for notifying motorists and pedestrians at an intersecton of the approach of the emergency vehicle. The principle means of notifying the motorists and pedestrians is a flashing light 12 which is mounted at the intersection, preferably on a light pole 18 containing a stop light 46. In use, wireless transmitter 40 sends an electromagnetic signal at a predetermined frequency to switching mechanism 16. A receiver 42 electrically connected to light 12 in switching mechanism 16 actuates switching mechanism 16 and thereby light 12. As a result, emergency personnel may warn motorists and pedestrians of the approach of an emergency vehicle at the intersection by actuating transmitter 40.

Although in a preferred embodiment emergency distress light 10 is used for notifying the approach of an emergency vehicle, obviously there are many other situations in which an emergency warning signal is required. In some of those instances a transmitter and receiver are not required. In such cases, switching mechanism 16 may simply be connected to a manual switch which is actuated by the user. Nevertheless, electrical connection of the emergency warning signal to an independent power source is still not required, since a solar collector 34 and rechargeable storage battery 36 are utilized.

In most embodiments of the invention, the storage battery 36, the switching mechanism 16 and the light means 12 are contained within a housing 20. Solar collector 34 is mounted on top of housing 20. Solar collector 34, in turn, is covered by clear dome 32. In a preferred embodiment, translucent sleeve 24 is constructed as a tubular lens which is preferably interposed between clear dome 32 and housing 20. Translucent sleeve 24 has a plurality of axial ledges and/or ridges 25 formed about its periphery and angled downward so as to direct light from the distal end of the stop light 46 downwardly onto the street to warn motorists of an approaching emergency vehicle. Alternatively, as seen in U.S. Ser. No. 559,731, clear dome 32 may cover both solar collector 34 and the light 12. In that instance, translucent sleeve 24 is contained within clear dome 32 and directs light radially from light means 12.

Interposed between translucent sleeve 24 and housing 20 is a gasket 24A which provides a water tight seal so as to prevent moisture or dirt into the device. Similarly, gasket 32A is provided between clear dome 32 and translucent sleeve 24 to prevent introduction of water or dirt.

As further shown in FIGS. 1 and 2, in a preferred embodiment, emergency warning system 10 has one or more horns 44 mounted on housing 20 and electrically connected to switching mechanism 16. Actuation of switching mechanism 16 actuates horn 44 thereby producing an audible signal at the intersection. In a preferred embodiment, a pair of horns 44a and 44b are oppositely disposed on housing 20. As a result, an audible signal is directed radially from the emergency warning system.

As shown in FIGS. 3 and 5, mounting mechanism 49 is used for mounting warning system 10 on a light pole 18. In one embodiment, shown in FIG. 5, mounting mechanism 49 comprises one or more bands such as bands 50 and 52 which are disposed around light pole 18 and housing 20. Preferably bands 50 and 52 are constructed of a substantially non-electrically conductive material such as plastic, which prevents electrical interference with the operation of transmitter 40 and receiver 42. In a preferred embodiment, however, mounting means 49 comprises a support strut 54, best shown in FIG. 3, which extends laterally from housing 20 to light pole 18. Support strut 54 separates light pole 18 from housing 20, thereby reducing electromagnetic interference, since light pole 18 is usually constructed of aluminum or steel. As also seen in FIGS. 3 and 7, proximate the proximal portion of housing 20 are a pair of interlocking brackets 56 and 58. Interlocking brackets 56 and 58 have a pair of curved indentations 60, 62, 64 and 66 which are designed for mating engagement with, respectively, housing 20 and light pole 18. Bracket indentations 60-66 have an inside diameter approximately equal to the outside diameter of housing 20 and pole 18. As a result, when brackets 56 and 58 are joined together they attach housing 20 to pole 18. Brackets 56 and 58 are joined together by fastening means, such as bolt 68, which extends through brackets 56 and 58. Alternatively, additional bolts or other commonly known attachment means may be utilized. In general, when installing emergency system 10 on a light pole 18, the user simply joins curved indentations 60 and 62 around light pole 18, joins curved indentations 64 and 66 around housing 20 and tightens bolt 68, thereby affixing housing 20 to light pole 18. Since no electrical connection is required between light pole 18 and distress light mechanism 10, the job is quickly and easily accomplished.

As best shown in FIGS. 1 and 2, in a preferred embodiment, housing 20 comprises a substantially tubular casing 26, preferably conducted of a relatively non-electrically conductive material such as polycarbonate, nylon or acrylic. Tubular casing 26 further includes a mounting plate 72 positioned proximate the distal end of housing 20 and adapted for attachment of solar collector 34. A second mounting plate 74 is positioned beneath mounting plate 72 and is utilized for mounting light 12. Light 12, in a preferred embodiment, comprises a strobe light 76 which includes a light bulb 23 and electrical components commonly known in the art. However the strobe light 76 of the present invention is unique in that it utilizes a current of less than one milliampere, thereby preventing excessive drainage of storage battery 36 during use.

As mentioned previously, in one embodiment transmitter 40 may have two or more switches or buttons such as push buttons 40A and 40B. Pushing each of the separate push buttons 40A, 40B etc. causes transmitter 40 to send an electromagnetic signal of a different frequency to receiver 42. Receiver 42, in turn has a filter integrally connected thereto which actuates switching mechanism 16 in response to the selected frequency. However, switching mechanism 16 is wired so that each electromagnetic frequency causes a separate function of distress light 10 to be actuated. For example, a first electromagnetic frequency causes actuation of light 12; a second electromagnetic frequency causes actuation of light 12 and horn 44; a third electromagnetic frequency causes actuation of both lights 12 and horn 44 etc. Thus, if desired, the emergency vehicle may cause a flashing light to be initially signaled, followed by a horn when the vehicle is in closer proximity to the intersection. Additionally, switching mechanism 16 may include a timer which deactivates light mechanism 12 after a selected period of time such as two minutes after actuation.

An additional feature of the present invention, best shown in FIG. 6 of the drawings, is storage battery 36. In a preferred embodiment, storage battery 36 comprises a high-charge nickel cadmium battery adapted for retaining an electrical charge of at least 12½ amp hours over an extended period of time. In order to contain storage battery 36 in a relatively small, maneuverable housing, in a preferred embodiment, storage battery 36 is less than six inches wide by twelve inches long. Similarly, in order to make both the storage battery 36 and the distress light 10 easy to install, and to make storage battery 36 easy to replace, storage battery 36 has a weight of less than fifteen pounds. In addition, storage battery 36 and switching mechanism 16 are connected as a module 78 on a removable board 80 which is insertable into tubular casing 26. Switching mechanism 16 in turn is connected to light mechanism 12 by means of a quick disconnect coupling 39, as mentioned above. As a result, in the event of a malfunction of the device 10, the head 48 of the device 10, comprising translucent sleeve 24 and clear dome 32 with solar collector 34 and light 12 contained therein may be disconnected from tubular casing 26. Tubular casing 26 is usually attached to translucent sleeve 24 by means of allen head bolts 48A, 48B, 48C and 48D. Module 78 comprising removable board 80, storage battery 36 and switching mechanism 16 may then be removed from tubular casing 26 by grasping of handle 82, which in a preferred embodiment, is integrally formed as part of removable board 80. Module 78 may then be slid out of tubular casing 26, quick disconnect coupling 39 disconnected and a new module 78 is inserted into tubular casing 26. Thus a quick and easy method of repair is provided.

Although the present invention is designed for use in connection with light poles, it may also be mounted on a tubular support, as seen in parent U.S. application Ser. No. 559,731, and mounted in proximity to emergency shelters such as fire stations, police stations, or hospitals. When the emergency personnel require a warning for passage of their vehicle, the distress light 10 may be actuated using either wireless transmitter 40 or by utilizing an electrical switch connected by wires to switching mechanism 16. As is evident from the above disclosure, not merely a single distress light but a system is provided where warning lights 10 may be provided at key intersections throughout a metropolitan area.

As best seen in FIG. 4 of the drawings, an additional aspect of the invention is the mounting of the distress lights 10 at an intersection. In a preferred embodiment, a pair of distress lights 10 and 10A are mounted diagonally across from each other at an intersection, and extending laterally from the light poles 18 and 18A into the intersection. As a result, the maximization of reception by receivers 42 is distress lights 10 and 10A is provided. In addition, on distress light 10, horns 44A and 44B are positioned so as to direct a klaxon sound radially along a first path of travel X. Conversely, horns 44C and 44D extend radially from device 10A so as to direct sound along a second path of travel Y normal to the first path. As a result, an audible signal is provided in all four directions upon actuation of the devices.

Returning to FIGS. 1 and 2, in a preferred embodiment, device 10 may include a reset switch mounted on the housing and electrically connected to switching mechanism 16 for manually deactivating the warning system as desired. Similarly, an indicator light 86 such as a light emitting diode may be electrically connected to storage battery 36 so as to indicate an adequate electrical charge contained therein. Indicator light 86 may also, if desired, be electrically connected to switching mechanism 16 so that it is only actuated upon receipt of a specified electromagnetic signal.

The foregoing description and drawings merely explain and illustrate the invention and the invention is not limited thereto except in so far as those who have the disclosure before them will be able to make modifications and variations therein without departing from the generally broad scope of this invention.

What is claimed is:

1. An emergency warning system for notifying passersby of the approach of an emergency vehicle to an intersection, said system comprising:

light means for providing a flashing light at said intersection;

a tubular lens member covering said light means, said tubular lens member having a plurality of ridges formed therein so as to direct light downwardly from said light means;

a solar collector for converting solar energy into electrical energy, said solar collector being electrically connected to said light means;

a rechargeable battery operatively connected to said solar collector and to said light means; and switching means for selectively actuating said light means, said switching means including a wireless transmitter adapted to send an electromagnetic signal at a predetermined frequency to said switching means, and a receiver electrically connected to said light means for actuation thereof when triggered by said transmitter, whereby emergency personnel may warn said passersby of the approach of said emergency vehicle by actuating said transmitter.

2. An emergency warning system for notifying passersby of the approach of an emergency vehicle to an intersection, said system comprising:

light means for providing a flashing light at said intersection;

a solar collector for converting solar energy into electrical energy, said solar collector being electrically connected to said light means;

a rechargeable battery operatively connected to said solar collector and to said light means; and switching means for selectively actuating said light means, said switching means including a wireless transmitter adapted to send an electromagnetic signal at a predetermined frequency to said switching means, and a receiver electrically connected to said light means for actuation thereof when triggered by said transmitter;

a housing member for containing said light means, said solar collector, said rechargeable battery and said switching mechanism; and mounting means for mounting said housing on a light pole, said mounting means including one or more support struts extending from said housing member to said light pole so as to separate said housing member from said light pole thereby reducing electromagnetic interference from said light pole, whereby emergency personnel may warn said passersby of the approach of said emergency vehicle by actuating said transmitter.

3. The emergency warning system of claim 2 wherein at least one of said support struts comprises:

a pair of interlocking brackets each bracket having a pair of curved indentations formed therein and adapted for mating engagement with respect to said light pole and said housing member, said brackets being selectively joined to each other so as to facilitate attachment of for attaching said warning system to said light pole.

* * * * *